United States Patent
Saito (10) Patent No.: US 7,170,844 B2
(45) Date of Patent: *Jan. 30, 2007

(54) OPTICAL PICK-UP APPARATUS AND CORRECTION LENS FOR USE IN THE APPARATUS

(75) Inventor: Shinichiro Saito, Hachioji (JP)

(73) Assignee: Konica Corporation, Tokyo (JP)

( * ) Notice: Subject to any disclaimer, the term of this patent is extended or adjusted under 35 U.S.C. 154(b) by 161 days.

This patent is subject to a terminal disclaimer.

(21) Appl. No.: 10/893,969

(22) Filed: Jul. 20, 2004

(65) Prior Publication Data

US 2004/0264345 A1    Dec. 30, 2004

Related U.S. Application Data

(63) Continuation of application No. 09/577,135, filed on May 24, 2000, now abandoned.

(30) Foreign Application Priority Data

May 27, 1999    (JP)    ................... 11-147732

(51) Int. Cl.
  *G11B 7/00*    (2006.01)
(52) U.S. Cl. ............... 369/112.01; 369/112.07; 369/44.23
(58) Field of Classification Search ........... 369/112.01, 369/112.23, 44.37, 112.1, 112.21; *G11B 7/00*
See application file for complete search history.

(56) References Cited

U.S. PATENT DOCUMENTS

| | | | |
|---|---|---|---|
| 5,754,512 A | 5/1998 | Komma et al. | |
| 5,757,758 A | 5/1998 | Yagi et al. | |
| 5,844,879 A * | 12/1998 | Morita et al. | 369/118 |
| 5,872,761 A | 2/1999 | Sugi et al. | |
| 5,889,748 A | 3/1999 | Shimano et al. | |
| 5,903,536 A | 5/1999 | Lee et al. | |
| 6,055,076 A | 4/2000 | Takahashi et al. | |

(Continued)

FOREIGN PATENT DOCUMENTS

EP    0 780 838 A1    6/1998

(Continued)

*Primary Examiner*—A M Psitos
(74) *Attorney, Agent, or Firm*—Finnegan, Henderson, Farabow, Garrett & Dunner, L.L.P.

(57) ABSTRACT

In an optical pick-up apparatus for recording to or reproducing from an optical information recording medium, the optical pick-up apparatus includes: a light source for emitting light flux; a light converging optical system having an aperture and an objective lens and converging the light flux emitted from the light source on the optical information recording medium; a photodetector for detecting light reflected from the optical information recording medium; and a driving section for driving the objective lens and the aperture in association with the objective lens. A non-parallel light is incident on the objective lens, the light converging optical system includes a first part and a second part which is more apart from an optical axis of the light converging optical system than the first part, and the light flux passed through the first part is converged on an information recording surface of the optical information recording medium through a transparent substrate of the optical information recording medium so that a wavefront aberration on the information recording surface is not more than 0.07 λ rms, and the light flux passed through the second part generates a spherical aberration.

9 Claims, 8 Drawing Sheets

| U.S. PATENT DOCUMENTS | | | | FOREIGN PATENT DOCUMENTS | | |
|---|---|---|---|---|---|---|
| 6,160,646 A | 12/2000 | Takahashi et al. | | EP | 0 932 145 A1 | 7/1999 |
| 6,172,779 B1 | 1/2001 | Takahashi et al. | | JP | H10-208276 A | 8/1998 |
| 6,181,668 B1 | 1/2001 | Kajiyama et al. | | JP | H10-293937 A | 11/1998 |
| 6,192,021 B1 | 2/2001 | Saito et al. | | JP | H11-086319 A | 3/1999 |
| 6,313,956 B1 | 11/2001 | Saito | | WO | WO 98/13826 A1 | 4/1998 |
| 6,363,037 B1 | 3/2002 | Yamazaki | | | | |
| 6,870,805 B1 * | 3/2005 | Arai et al. ............ 369/112.07 | | * cited by examiner | | |

PRIOR ART

OPTICAL PICK-UP APPARATUS AND CORRECTION LENS FOR USE IN THE APPARATUS

CROSS-REFERENCE TO RELATED APPLICATIONS

This is a continuation of application Ser. No. 09/577,135, filed May 24, 2000, now abandoned, and claims the benefits of priority under 35 U.S.C. §§119 of Japanese Patent Application No. 147732/1999 filed in the Japanese Patent Office on May 27, 1999, the entirety of all of which is incorporated herein by reference.

BACKGROUND OF THE INVENTION

The present invention relates to an optical pick-up apparatus to record/reproduce the optical information by converging the light flux emitted from a laser light source by an objective lens onto the information recording surface through a transparent substrate, and to a correction lens in a converging optical system. Particularly, the present invention relates to an optical pick-up apparatus structured such that recording/reproducing is conducted by one objective lens for the first optical information recording medium in which the thickness of the transparent substrate is t1, and for the second optical information recording medium in which the thickness of the transparent substrate is t2 (t2>t1), and at the time of recording/reproducing of the second optical information recording medium, the diverging light flux is entered into in the objective lens, and to a correction lens.

Recently, as a short wavelength red semiconductor laser is put to practical use, a DVD (digital versatile disk) having the large capacity and high density, whose dimensions are almost the same as the conventional CD (compact disk), comes into the market. In this DVD, as the numerical aperture (NA) of the objective lens when the short wavelength red semiconductor laser of 635 nm or 650 nm is used as the light source, about 0.6 is necessary.

Further, as a CD-R which is a recordable compact disk, spreads, the interchangeability with the CD-R is also required, as the optical pick-up apparatus. Because the reflection rate of the CD-R is reduced on the short wavelength side of 635 nm or 650 nm, and the necessary signals (a reproduction signal, focus error signal, and tracking error signal) can not be obtained, the semiconductor laser of 780 nm is prepared for these CD-Rs, separately from the short wavelength semiconductor laser for the DVD.

For the optical pick-up apparatus to record/reproduce these plurality of optical disks, the light sources for each of optical disks are prepared, however, for the sake of simplification of the optical pick-up apparatus, it is required that the interchangeability of one objective lens for each optical disk is secured. In order to secure the interchangeability, irrespective of the wavelength of light source of each optical disk, and the thickness of the transparent substrate of each optical disk, it is necessary that, at least, a good converging spot is formed on the information recording surface.

Figure 7:
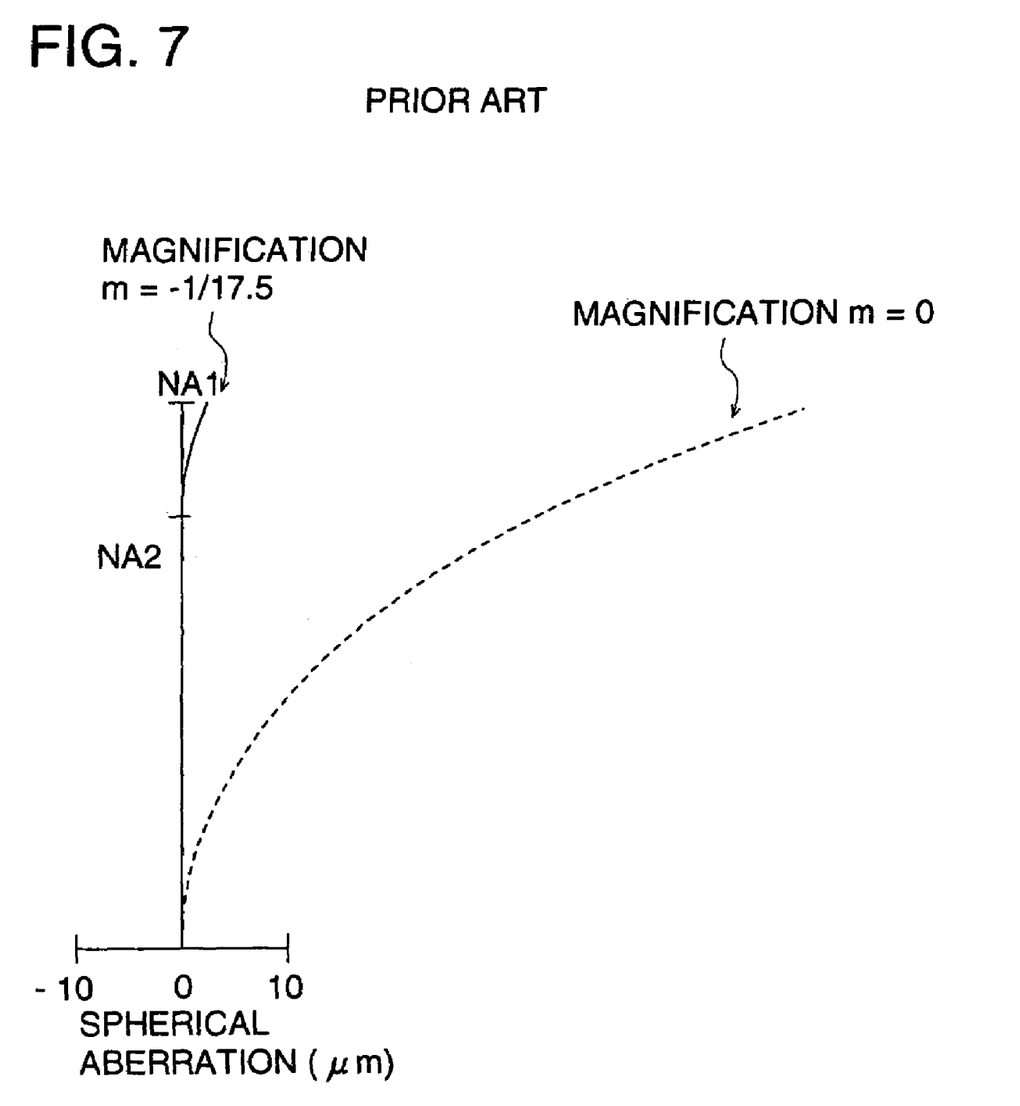
FIG. 7 is a view showing the spherical aberration of the conventional converging optical system.

However, in the case where the thickness of the transparent substrate is different, when the magnification m of the objective lens is the same in each optical disk, at least in one optical disk, the spherical aberration is generated. The dotted line in FIG. 7 shows the spherical aberration of the CD when, for both of the DVD and CD, m=0, and the objective lens is designed such that the spherical aberration is not larger than the limit of the diffraction (0.07 λrms) at the time of the DVD recording and reproducing. When such the spherical aberration is generated, the conversing spot on the information recording surface is deteriorated.

Therefore; for correction of the spherical aberration generated when the thickness of the transparent substrate is different, the technology by which the magnification of the objective lens is changed when the DVD is used, different from the case of the use of the CD, is used. The solid line in FIG. 7 shows the spherical aberration when the magnification of the lens at the time of the use of the CD is m=−1/17.5 (the incidence of the diverging light to the objective lens). Herein, the numerical aperture NA1=0.60 in the actual use of the DVD, and the numerical aperture NA2=0.45 in the actual use of the CD are shown on the vertical axis in FIG. 7.

However, in the optical system in which the light flux from the definite distance enters the objective lens, the following disadvantages occur. That is, because the diverging spherical wave enters the objective lens, when the objective lens shifting occurs in the tracking, because the light flux obliquely enters the objective lens due to the shifting of the optical axis, the coma is generated.

Figure 8:
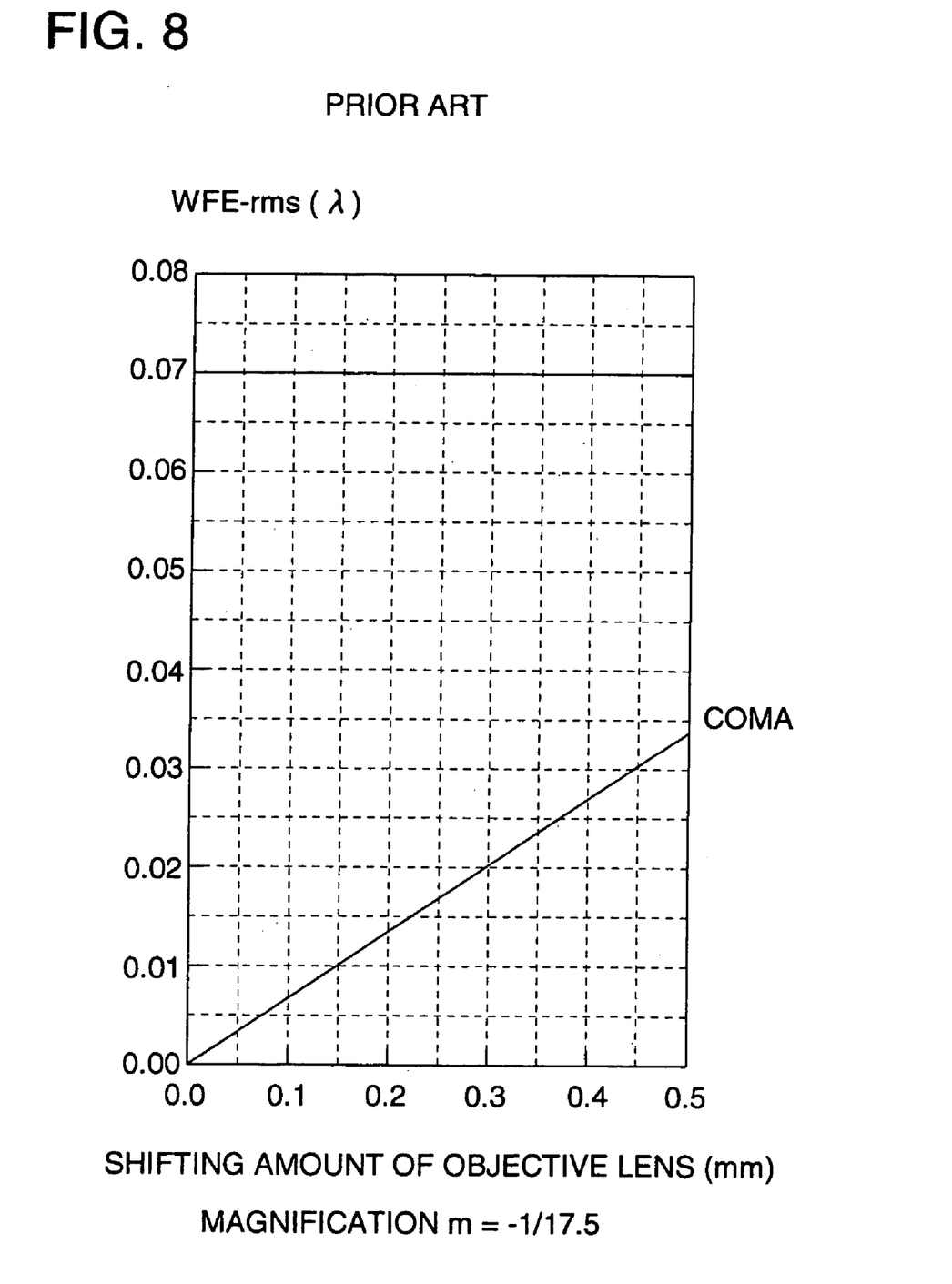
FIG. 8 is a view showing the coma when the objective lens is shifted, in the conventional objective lens.

FIG. 8 is a view showing the coma generated by the objective lens shifting in the above magnification m=−1/17.5 and the focal distance f=3.5 mm. That is, when the diverging light enters the objective lens, the spherical aberration can be corrected, however, in this case, the coma generated by the objective lens shifting becomes a new problem. Also by the generation of this coma, the optical spot formed on the information recording surface of the optical disk is deteriorated, and which is not preferable in the recording/reproducing of the optical disk.

SUMMARY OF THE INVENTION

The object of the present invention is to obtain an optical system which can suppress the generation of such the coma.

The structures (1) to (12) to attain the above object are as follows.

Structure (1): An optical pick-up apparatus to record/reproduce an optical information recording medium, which comprising: a light source; a converging optical system having an aperture and an objective lens; and a light detector, wherein the optical pick-up apparatus has a driving section to drive the objective lens and the aperture by interlocking with each other; a non-parallel light flux enters the objective lens; the converging optical system has the first section, and the second section which is more separated from the optical axis of the converging optical system than the first section; the light flux passed though the first section is converged on the information recording surface of the optical information recording medium through the transparent substrate of the optical information recording medium so that the wavefront aberration on the information recording surface is not larger than 0.07 λrms; and the light flux passed through the second section is made to generate the spherical aberration.

Structure (2): The optical pick-up apparatus according to Structure (1), wherein the objective lens is an aspherical lens.

Structure (3): The optical pick-up apparatus according to Structure (1), wherein the first section is within the range of the numerical aperture NA in the actual use of the information recording medium, and the second section is outside the range of the NA.

Structure (4): The optical pick-up apparatus according to Structure (1), wherein the converging optical system has a correction lens on the light source side than the objective lens and the aperture; the correction lens has the first section and the second section; the light flux passes through the first section of the correction lens is converged on the information recording surface of the optical information recording medium through the transparent substrate of the optical information recording medium so that the wavefront aberration on the information recording surface is not larger than 0.07 λrms; and the light flux passed through the second section of the correction lens is made to generate the spherical aberration.

Structure (5): The optical pick-up apparatus according to Structure (1), wherein the light flux passed through the second section generates the excessive spherical aberration.

Structure (6): The optical pick-up apparatus according to Structure (1), wherein the light source is one.

Structure (7): The optical pick-up apparatus according to Structure (1), wherein the non-parallel light flux is the divergent light flux.

Structure (8): The optical pick-up apparatus according to Structure (1), wherein the optical pick-up apparatus is an optical pick-up apparatus to record/reproduce the first optical information recording medium having the first transparent substrate whose thickness is t1 and the second optical information recording medium having the second transparent substrate whose thickness is t2 (t2>t1); the light source has the first light source to emit the first light flux of the wavelength λ 1 to record/reproduce the first optical information recording medium and the second light source to emit the second light flux of the wavelength λ2 (λ2 >λ1) to record/reproduce the second optical information recording medium; the first light flux is converged onto the first information recording surface of the first optical information recording medium through the first transparent substrate of the first optical information recording medium so that the wavefront aberration on the first information recording surface is not larger than 0.07 λrms; the second light flux passes through the first section is converged onto the second information recording surface of the second optical information recording medium through the second transparent substrate of the second optical information recording medium so that the wavefront aberration on the second information recording surface is not larger than 0.07 λrms; and the second light flux passed through the second section is made to generate the spherical aberration.

Structure (9): The optical pick-up apparatus according to Structure (8), wherein the first light flux enters into the objective lens as the parallel light flux, and the second light flux enters into the objective lens as the diverging light flux.

Structure (10): The optical pick-up apparatus according to Structure (8), wherein the converging optical system has a correction lens outside the optical path of the first light flux; the correction lens has the first section and the second section; the second light flux passed though the first section of the correction lens is converged onto the information recording surface of the optical information recording medium through the transparent substrate of the optical information recording medium so that the wavefront aberration on the information recording surface is not larger than 0.07 λrms; and the second light flux passed through the second section of the correction lens is made to generate the spherical aberration.

Structure (11): The optical pick-up apparatus according to Structure (8), wherein the first section is within the range of the numerical aperture NA2 in the actual use of the second optical information recording medium, and the second section is outside the range of the NA2.

Structure (12): A correction lens for use in the optical pick-up apparatus to record/reproduce the optical information recording medium, comprising an aspheric surface, wherein the aspheric surface has the first section, and the second section which is more separated from the optical axis of the correction lens than the first section; and in the light flux passed through the first section and the light flux passed through the second section, the generation amount of the spherical aberration is changed.

Further, preferable Structures (13) to (19) are as follows.

Structure (13): An optical pick-up apparatus which converges the light flux emitted from a light source onto the information recording surface by the converging optical system through a transparent substrate of the optical information recording medium, and records/reproduces the optical information recording medium, the optical pick-up apparatus characterized in that: the aperture is structured so as to be driven by interlocking with the objective lens; when the non-parallel light flux enters into the objective lens of the converging optical system, in the converging optical system, the spherical aberration is corrected to the same degree as the limit of the diffraction, or not larger than that, within the range of the numerical aperture NA in the practical use, and the spherical aberration is generated outside of the numerical aperture NA.

By such the structure, the coma generated by the objective lens shifting in the case of the incidence of the diverging light beam can be corrected.

Structure (14): The optical pick-up apparatus which converges the light flux onto the information recording surface by the converging optical system through the transparent substrate of the optical information recording medium, and has the first light source with the wavelength λ1 to record/reproduce the first optical information recording medium with the transparent substrate thickness t1, and the second light source with the wavelength λ2 to record/reproduce the second optical information recording medium with the transparent substrate thickness t2 (t2>t1), and records/reproduces a plurality of optical information recording media by one objective lens, the optical pick-up apparatus characterized in that: the aperture is structured so as to be driven by interlocking with the objective lens; the diverging light flux enters into the objective lens at the time of recording/reproducing of the second optical information recording medium; the spherical aberration is corrected to the same degree as the limit of the diffraction, or not larger than that, within the range of the numerical aperture NA2 in the actual use of the second optical information recording medium, and the spherical aberration is set to be excessive outside of the numerical aperture NA2.

By this structure, the coma generated by the objective lens shifting can be corrected while being satisfied with the spherical aberration correction on the axis, for the second optical information recording medium.

Structure (15): In this case, when the lens which generates the excessive spherical aberration, is placed outside the optical path of the optical system for recording/reproducing of the first information recording medium, the bad influence on the first information recording medium can be reduced.

Structure (16): When the optical system is structured such that the magnification m2 of the single body of the objective lens when the non-parallel light flux enters, is m2 <0, and in the converging optical system other than the objective lens, the excessive spherical aberration in the outside of the NA2 is generated, while both the first optical information recording medium and the second optical information recording medium are being satisfied with the spherical aberration on the axis, in the second optical information recording medium, the coma generated by the objective lens shifting can be corrected.

Structure (17): The above optical system is used for the optical pick-up apparatus which converges the light flux emitted from a light source onto the information recording surface by the converging optical system through a transparent substrate of the optical information recording medium, and records/reproduces the optical information recording medium, and which can be realized when the correction lens which changes an amount of the spherical aberration with the border at near the numerical aperture NA2 in the actual use, is placed in the converging optical system in which the non-parallel light flux enters into the objective lens, thereby, the coma generated by the objective lens shifting can be corrected.

Structure (18): In the correction lens in the converging optical system for use in the optical pick-up apparatus which converges the light flux emitted from the light source onto the information recording surface by the converging optical system through the transparent substrate of the optical information recording medium, and has the first light source with the wavelength $\lambda 1$ to record/reproduce the first optical information recording medium with the transparent substrate thickness t1, and the second light source with the wavelength $\lambda 2$ to record/reproduce the second optical information recording medium with the transparent substrate thickness t2 (t2>t1), and records/reproduces a plurality of optical information recording media by one objective lens, the aperture is structured so as to be driven by interlocking with the objective lens; the converging optical system to record/reproduce the second optical information recording medium is structured such that the diverging light flux enters into the objective lens of the converging optical system; an amount of generation of the spherical aberration is changed with the border in the vicinity of the numerical aperture NA2 in the actual use of the second optical information recording medium; and the spherical aberration is made relatively excessive outside of the NA2. Thereby, while being satisfied with the spherical aberration correction on the axis, the coma generated by the objective lens shifting can be corrected, in the second optical information recording medium.

Structure (19): When the correction lens to generate the excessive spherical aberration, is placed outside of the optical path of the recording/reproducing optical system of the first optical information recording medium, the bad influence on the first optical information recording medium can be reduced.

DETAILED DESCRIPTION OF THE PREFERRED EMBODIMENT

An optical pick-up apparatus of the present invention has a light source, a converging optical system having an aperture and an objective lens, and a optical detector. The optical pick-up apparatus has a driving section such as a motor or an actuator, which drives the objective lens and the aperture by interlocking with them, in the case of tracking, or the like. The non-parallel light flux enters the objective lens. Further, the converging optical system has the first section, and the second section which is more separated from the optical axis of the converging optical system than the first section, and is placed outside. The light flux passed through the first section is converged onto the information recording surface of the optical information recording medium through the transparent substrate of the optical information recording medium so that the wavefront aberration on the information recording surface is not larger than 0.07 $\lambda$rms, and the light flux passed through the second section is made to generate the spherical aberration. Specifically, it is preferable that the light flux passed through the second section generates a spherical aberration before the light flux is incident on the objective lens.

The spherical aberration which is made to be generated by the light flux passed through the second section, is preferably the overly corrected spherical aberration. Further, this spherical aberration is preferably the spherical aberration so as to cancel the coma generated by the objective lens shifting.

Incidentally, it is preferable that the first section is within the range of the numerical aperture NA in the actual use of the optical information recording medium, and the second section is outside the range of the NA. The numerical aperture in the actual use means the numerical aperture in which, in the optical information recording medium recording/reproducing apparatus, the recording/reproducing of the information of the optical information recording medium can be conducted, by the light flux of a predetermined wavelength, however, the numerical aperture regulated by the standard of an optical information recording medium, may also be allowed. For example, in the case of the CD, NA=0.45, and in the case of the DVD, NA=0.6.

Further, it is preferable that the converging optical system has the correction lens on the more light source side than the objective lens and the aperture, and the correction lens has the first section and the second section. In that case, the light flux passed through the first section is converged onto the information recording surface of the optical information recording medium through the transparent substrate of the optical information recording medium so that the wavefront aberration on the information recording surface is not larger than 0.07 $\lambda$rms, and the light flux passed through the second section of the correction lens is made to generate the spherical aberration.

Incidentally, the correction lens is preferably a lens having an aspheric surface. It may be the lens surface expressed by the expression of one aspheric surface, or a lens having a different aspheric surface in the first section and the second section, or a lens which has a step, and in which the first section and the second section are divided by the step. Further, it may be a plastic lens or a glass lens.

Further, the objective lens is preferably an aspherical lens. Further, it is preferable that it does not have a step or a shielding portion on the lens surface, and it is an aspherical lens which can be expressed by one aspherical expression. When such the objective lens is used, as the aperture, it is preferable that an aperture having the wavelength selectivity is used. As the aperture having the wavelength selectivity, an aperture which transmits the light having a predetermined wavelength and by which the light having another wavelength is shielded, as a dichromatic filter, or an aperture whose dimensions can be mechanically changed corresponding to the wavelength of the light source, is listed.

Further, as the objective lens, a lens having the diffraction surface, or a lens which has the first divided surface, second divided surface, and third divided surface form the optical axis, and in which the first divided surface and the third divided surface are the same aspheric surface, and the second divided surface is different aspheric surface, may be used. Further, these lenses are used, as the aperture, an aperture having no wavelength selectivity may be used.

Further, the optical pick-up apparatus may be an apparatus which records/reproduces only one kind of optical information recording medium, or may an apparatus which ca record/reproduces more than 2 kinds of optical information recording media.

When the optical pick-up apparatus is an apparatus which records/reproduces only one kind of optical information recording medium, the light source is preferably one. Further, the non-parallel light flux is preferably a divergent ray of light.

When the optical pick-up apparatus is an optical pick-up apparatus which records/reproduces the first optical information recording medium having the first transparent substrate of the thickness of t1, and the second optical information recording medium having the second transparent substrate of the thickness of t2 (t2>t1), the mode of the apparatus is preferably as follows:

The light source has the first light source which emits the first light flux having the wavelength $\lambda 1$ to record/reproduce the first optical information recording medium, and the second light source which emits the second light flux having the wavelength $\lambda 2$ ($\lambda 2 > \lambda 1$) to record/reproduce the second optical information recording medium. The light flux is converged onto the first information recording surface of the first optical information recording medium through the first transparent substrate so that the wavefront aberration on the first information recording surface is not larger than 0.07 $\lambda$rms. Further, the second light flux passed through the first section is converged onto the second information recording surface of the second optical information recording medium through the second transparent substrate so that the wavefront aberration on the second information recording surface is not larger than 0.07 $\lambda$rms, and the second light flux passed through the second section is made to generate the spherical aberration.

In this case, it is preferable that the first light flux enters into the objective lens as the parallel light flux, and the second light flux enters into the objective lens as the diverging light flux. Further, the converging optical system preferably has a correction lens having the first section and the second section outside the optical path of the first light flux. Further, it is preferable that the first section is within the range of the numerical aperture NA2 of the actual use of the second optical information recording medium, and the second section is outside the range of NA2.

The correction lens used in the optical pick-up apparatus to record/reproduce the optical information recording medium of the present invention has an aspheric surface. Further, the aspheric surface has the first section, and the second section which is more separated from the optical axis of the correction lens than the first section, and in the light flux passed through the first section, and the light flux passed through the second section, an amount of the generation of the spherical aberration is made to be changed. In addition, it is preferable that the second section generates very large overly spherical aberration. For example, it is preferable that spherical aberration is not more than 5 μm (more preferably not more than 2 μm) in 0.8 NA2, and the spherical aberration is not less than 10 μm (more preferably not less than 20 μm) in 1.2 NA2.

Further, the optical information recording medium recording/reproducing apparatus has the optical pick-up apparatus of the present invention, and further has a spindle motor, and the like.

Referring to the drawings, the mode for carrying out the present invention will be described.

(The First Embodiment)

Figure 1:
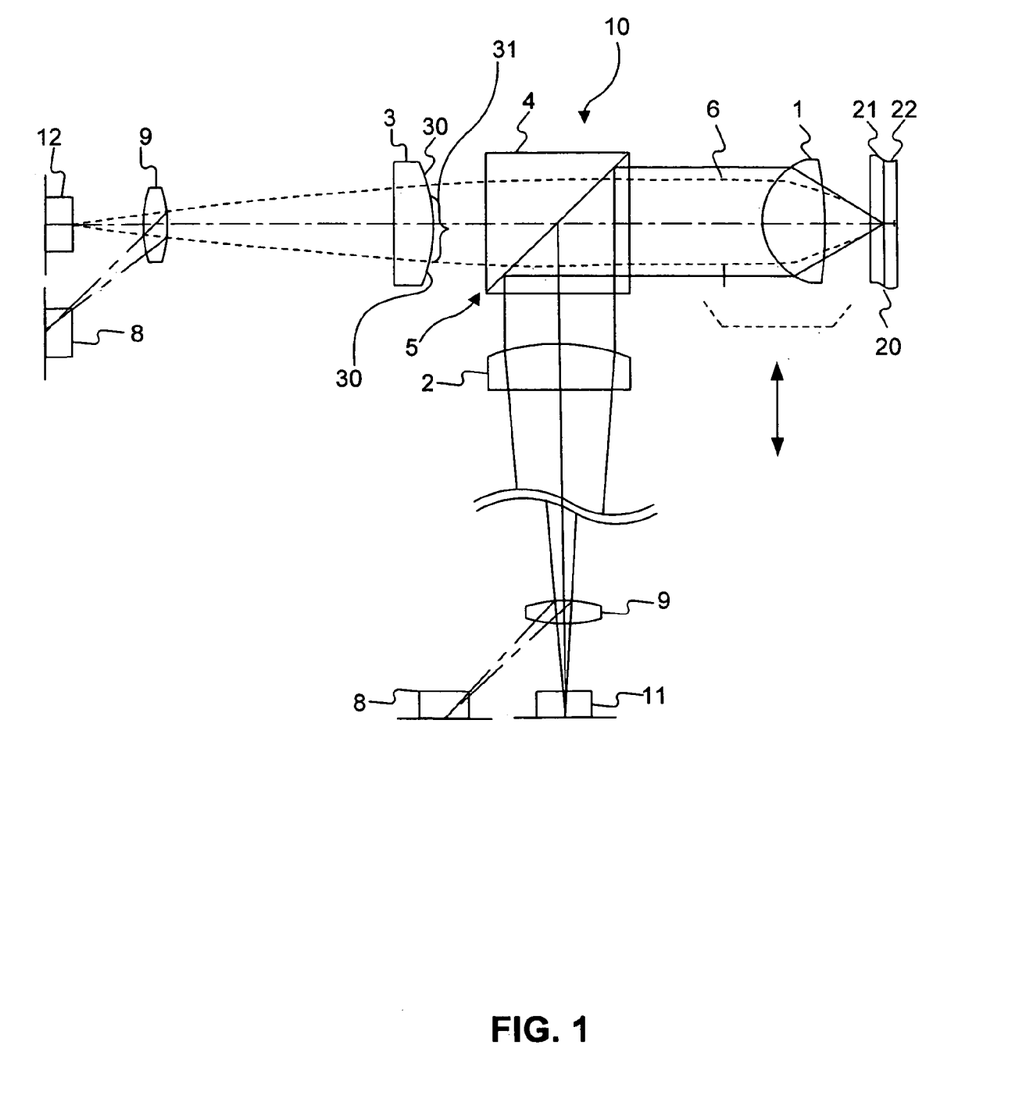
FIG. 1 is a schematic structural view of an optical system of the first embodiment of an optical pick-up apparatus of the present invention.

FIG. 1 is a schematic structural view of an optical pick-up apparatus 10 showing the embodiment 1 of the present invention.

The optical pick-up apparatus 10 of the present embodiment records/reproduces a plurality of optical disks, as an optical disk 20 which is an optical information recording medium. Hereinafter, the plurality of optical disks 20 is assumed as the first optical disk (DVD) having the transparent substrate thickness t1, and the second optical disk (CD/CD-R) having the transparent substrate thickness t2 which is different from t1, and will be explained. Herein, the thickness of the transparent substrate is t1=0.6 mm, and t2=1.2 mm.

The optical pick-up apparatus 10 of the present embodiment has, as the light source, the first semiconductor laser 11 as the first light source (the wavelength $\lambda 1$=610 nm to 670 nm), and the second semiconductor laser 12 as the second light source (the wavelength $\lambda 2$=740 nm to 870 nm). These first light source and second light source are exclusively used corresponding to the optical disk to be recorded/reproduced.

A converging optical system 5 is a means for converging the light flux emitted from the first semiconductor laser 11 and the second semiconductor laser 12 onto respective information recording surfaces 22 through the transparent substrate 21 of the optical disk 20, and forming a light spot. In the present embodiment, as the converging optical system 5, on the optical path of the first optical disk, a collimator lens 2 to convert the light flux emitted from the first semiconductor laser 11 to the parallel light (may be almost parallel), and an objective lens 1 to converge the light flux converted to the parallel light by the collimator lens 2 onto the information recording surface 22 are provided. Further, as the converging optical system 5 of the second optical disk, a coupling lens 3 to convert the light flux emitted from the second semiconductor laser 12 into the spreading angle, and the objective lens 1 exist. The converged light is reflected on the information recording medium and then is incident to a photodetector 8 by which the incident light is detected through a lens 9. Incidentally, in the case there are two light sources, there are preferably also two photodetectors.

In the present embodiment, the optical path of the first optical disk and the second optical disk is structured such that the objective lens 1 is commonly used through a beam splitter 4.

Between the beam splitter 4 and the objective lens 1, an aperture 6 having the wavelength selectivity exists, and the numerical aperture of the aperture 6 is changeable corresponding to the optical disk. The aperture is limited so that, when the first optical disk is used, the numerical aperture of the objective lens 1 is NA1=0.60, and when the second optical disk is used, the numerical aperture of the objective lens 1 is NA2=0.45. Further, this aperture 6 is driven by interlocking with the objective lens 1, and when the objective lens 1 is shifted as shown in the arrow, the aperture 6 is structured to shift also in the same direction.

Herein, in the first optical disk (the transparent substrate thickness is 0.6 mm) having the large numerical aperture, the objective lens 1 is designed so that, when the parallel light (magnification m=0) enters into the objective lens, the spherical aberration is not larger than the diffraction limit. Further, the magnification m, by which the spherical aberration generated when the second optical disk is used (the transparent substrate thickness is 1.2 mm), can be corrected, is determined. In the transparent substrate thickness of the DVD and CD, when the magnification when the DVD is used, is m=0, when it is structured such that the diverging light of the magnification m=about −1/20 at the time of use of the CD, enters into the objective lens 1, the spherical aberration can be corrected.

Then, a coupling lens 3 which satisfies the spreading angle of the second semiconductor laser 12 and the above magnification is provided. The coupling lens 3 (correction lens) changes an amount of generation of the spherical aberration with the border at near the numerical aperture NA2=0.45 in the actual use. When observing the whole of the converging optical system (the coupling lens 3 and the objective lens 1 in the second optical disk), the spherical aberration is not larger than the diffraction limit within the range of the NA2 (first section 31), and in the range of the outside of the NA2 (second section 30), the excessive spherical aberration is generated. According to this, the coma when the objective lens 1 is shifted in the direction perpendicular to the optical axis, can be corrected.

This coupling lens 3 exists in the optical path of the second optical disk 2, and because there is no influence on the fist optical disk, even when the above spherical aberration is made to be generated, there is no bad influence on the first optical disk.

(The Second Embodiment)

The second embodiment of the optical pick-up apparatus 10 of the present invention will be described below by the schematic structural view shown in FIG. 4.

Figure 4:
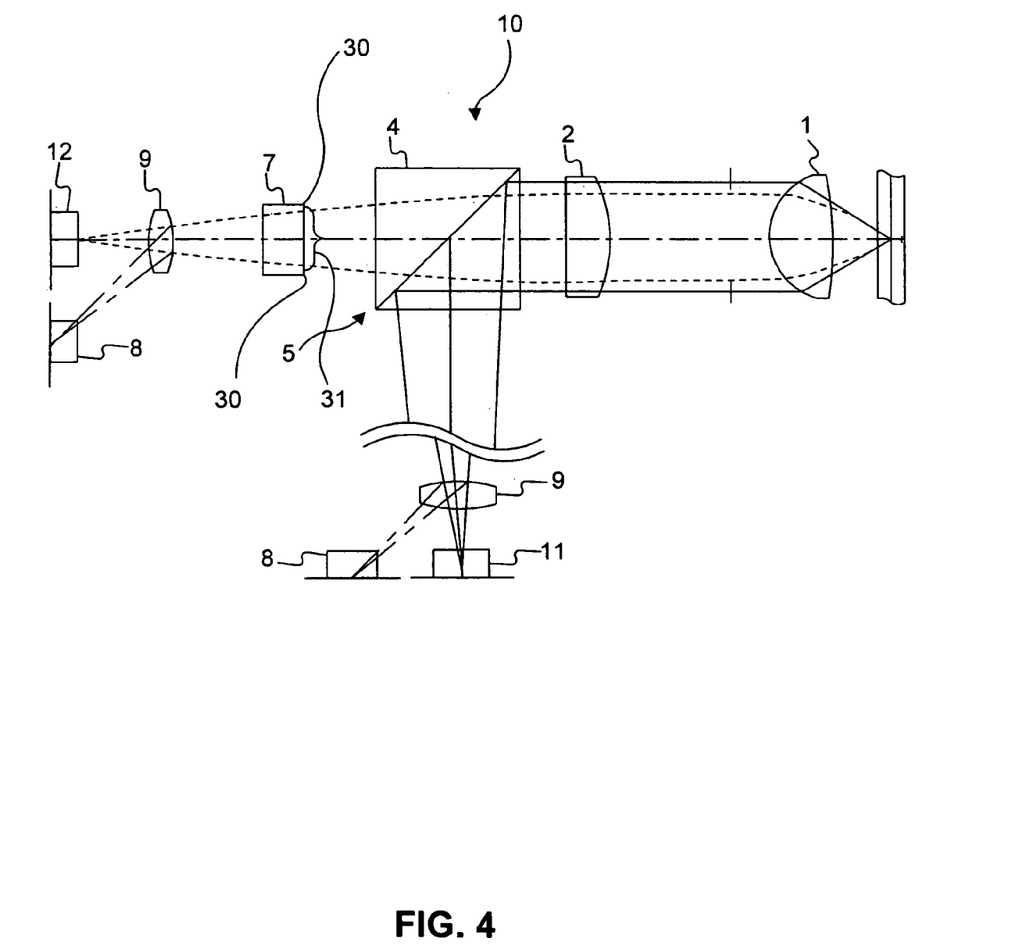
FIG. 4 is a schematic structural view of an optical system of the second embodiment of the optical pick-up apparatus of the present invention.

In the second embodiment in FIG. 4, the objective lens 1 and the collimator lens 2 are used in common with a plurality of optical disks, and when the second optical disk is used, it is structured that the diverging light enters into the objective lens 1 through the correction lens 7 between the beam splitter 4 and the second semiconductor laser 12. Further, when the converging optical system 5 of the second optical disk generates the spherical aberration which is not larger than the diffraction limit within the range of the numerical aperture NA2=0.45 in the actual use (first section 31), and is excessive in the range of the outside of the NA2 (second section 30), by the correction lens 7, the coma when the objective lens 1 is shifted in the direction perpendicular to the optical axis, can be corrected.

This correction lens 7 exists in the optical path of the second optical disk 2, and because there is no influence on the fist optical disk, even when the above spherical aberration is made to be generated, there is no bad influence on the first optical disk.

Hereinafter, an example of the present invention will be described.

EXAMPLE 1

The present example is the data of the optical system of the above first embodiment. As the first optical disk, the DVD (the thickness t1 of the transparent substrate=0.6 mm) is used and recorded/reproduced at the wavelength $\lambda 1$=650 nm of the first semiconductor laser, and as the second optical disk, the CD/CD-R (the thickness t2 of the transparent substrate=1.2 mm) is used, and recorded/reproduced at the wavelength $\lambda 2$=780 nm of the second semiconductor laser. The lens data is shown in Table 1, and the aspheric surface data is shown in Table 2.

Herein, the DVD has the same structure as the conventional technology in which the magnification m=0, and it has the feature when the CD is used. Accordingly, the description of the DVD is omitted, and only at the time of the use of the second optical disk, the DVD will be described. Incidentally, the focal length at the 650 nm of the objective lens is f=3.5 mm, which is as shown in FIG. 8.

Incidentally, in Table 1, the light emitting point of the 2 semiconductor lasers is defined as the 0 surface, and in the advancing direction of the light beam, the number i is denoted in the order, and the denotation of the number is shown up to the information recording surface of the optical disk. However, the cover glass of the semiconductor laser is omitted. Further, r shows the radius of the curvature, d shows the surface interval between the i-th surface and the (i+1)-th surface, and n shows the refractive index.

The equation of the aspheric surface is based on the following expression. Where, X is an axis in the direction of the optical axis, H is an axis perpendicular to the optical axis, and the advancing direction of the light beam is defined as positive, and κ is the conical coefficient, Aj is the aspheric surface factor, and Pj is the exponent of the aspheric surface.

TABLE 1

$$X = \frac{H^2/r}{1 + \{1 - (1 + \kappa)(H/r)^2\}^{0.5}} + \sum A_j H^{P_j}$$

| i | r | d | N |
|---|---|---|---|
| 0 (light emitting point) |  | 11.2 | 1 |
| 1 (correction lens) | −72.899 | 1.3 | 1.48616 |
| 2 | −6.91 | 2 | 1 |
| 3 (beam splitter) | ∞ | 5.5 | 1.51072 |
| 4 | ∞ | 3 | 1 |
| 5 (aperture) |  | 1 | 1 |
| 6 (objective lens) | 2.077 | 2.3 | 1.48616 |
| 7 | −6.221 | 1.68 | 1 |
| 8 (transparent substrate) | ∞ | 1.2 | 1.57079 |
| 9 | ∞ |  |  |

TABLE 2

| The second surface | $\kappa = 0.11349 \times 10$ | |
|---|---|---|
| | $A_1 = 0.56916 \times 10^{-3}$ | $P_1 = 4.0$ |
| | $A_2 = 0.16737 \times 10^{-4}$ | $P_2 = 6.0$ |
| | $A_3 = 0.43090 \times 10^{-6}$ | $P_3 = 8.0$ |
| | $A_4 = 0.15141 \times 10^{-5}$ | $P_4 = 10.0$ |

TABLE 2-continued

| | | |
|---|---|---|
| The sixth surface | κ = −0.71605 | |
| | A1 = 0.26343 × 10$^{-2}$ | P1 = 4.0 |
| | A2 = 0.19542 × 10$^{-3}$ | P2 = 6.0 |
| | A3 = 0.14818 × 10$^{-4}$ | P3 = 8.0 |
| | A4 = 0.14002 × 10$^{-5}$ | P4 = 10.0 |
| The seventh surface | κ = −0.24580 × 10$^2$ | |
| | A1 = 0.51717 × 10$^{-2}$ | P1 = 4.0 |
| | A2 = −0.79229 × 10$^{-3}$ | P2 = 6.0 |
| | A3 = 0.82300 × 10$^{-4}$ | P3 = 8.0 |
| | A4 = −0.45680 × 10$^{-5}$ | P4 = 10.0 |

Figure 2:
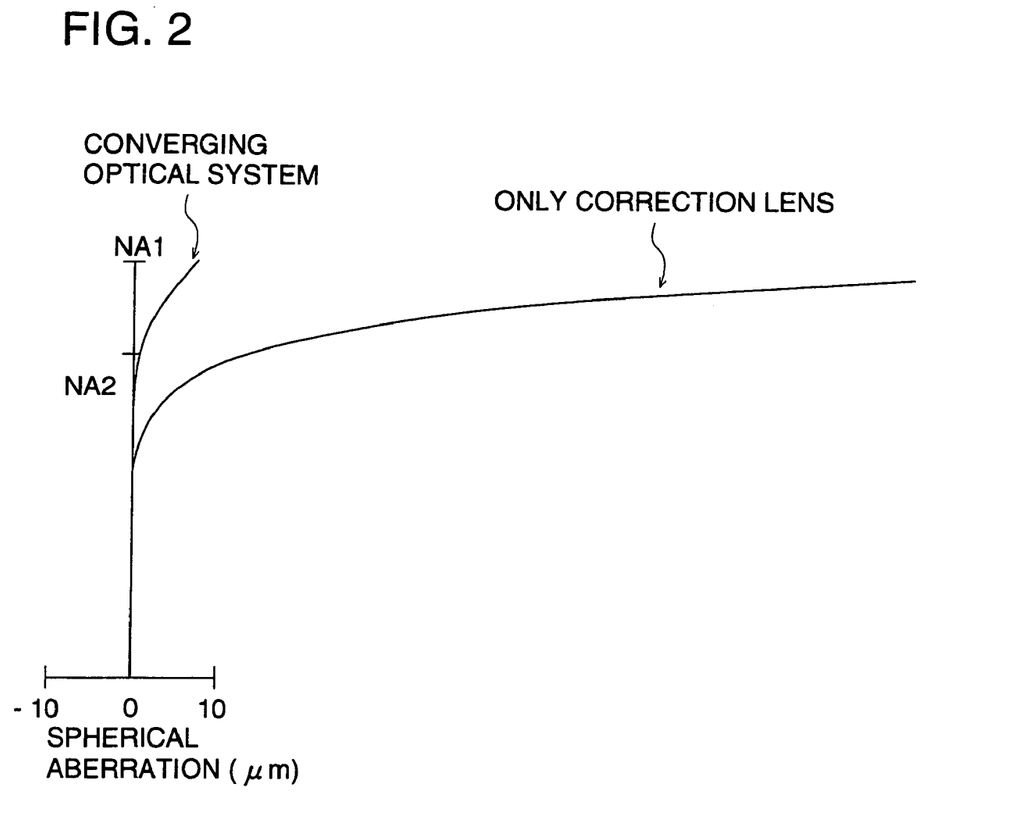
FIG. 2 is a view of the spherical aberration of the optical system and a correction lens of the first embodiment.

FIG. 2 is a view showing the spherical aberration of the whole converging optical system 5 and the spherical aberration of the correction lens (coupling lens 3) single body in the present example. As shown in the drawing, the correction lens changes an amount of generation of the spherical aberration with a boundary at near the numerical aperture NA2=0.45 in the actual use. In the vicinity of the optical axis, the spherical aberration is not larger than the diffraction limit, and as the light flux goes to the outside, the light flux is made to have the excessive spherical aberration. The residual spherical aberration on the axis in the range of the NA2 of the second optical disk in this design, is 0.003 λrms.

Figure 3:
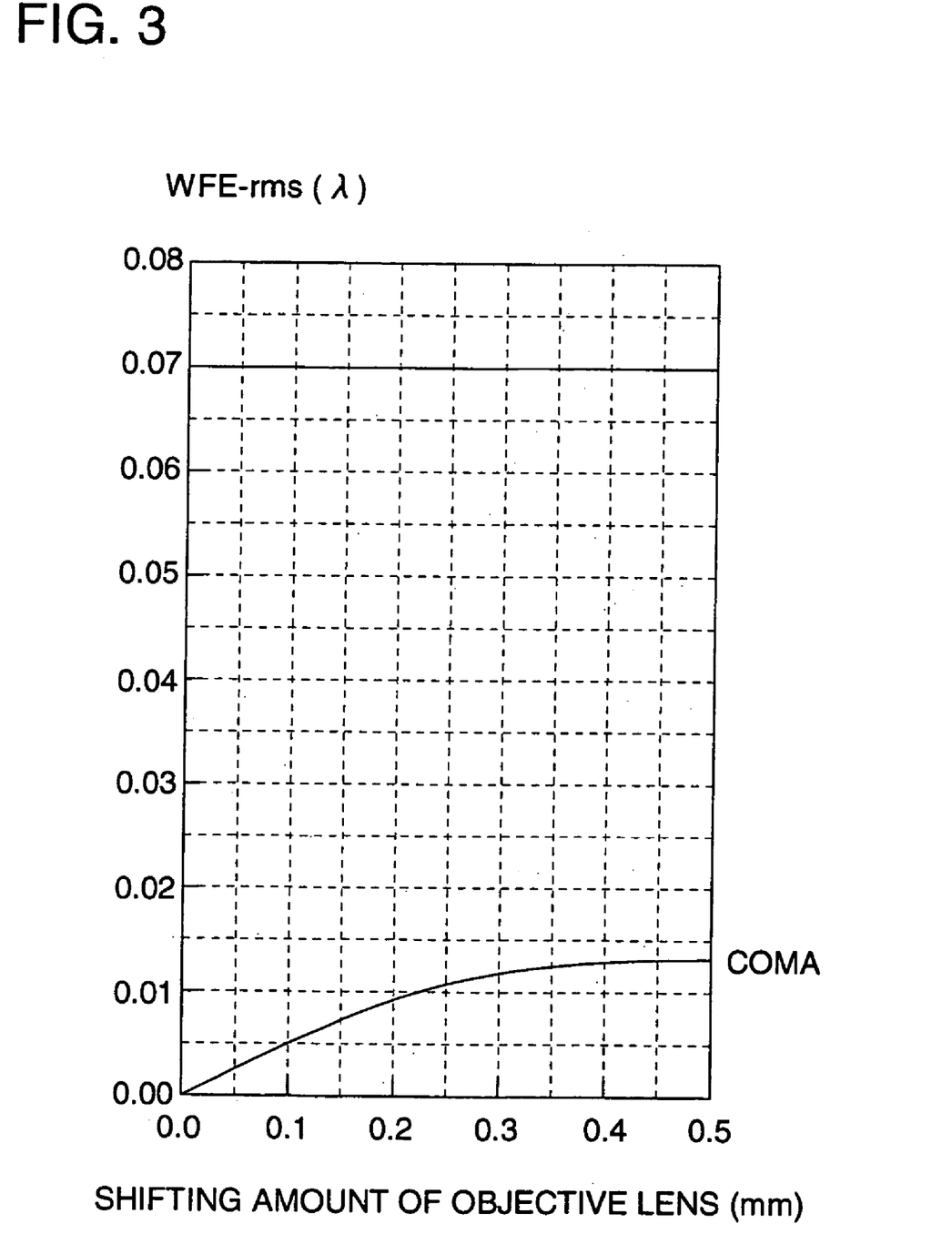
FIG. 3 is a view of the coma when an objective lens and an aperture are shifted by interlocking with each other, in a converging optical system of the first embodiment.

FIG. 3 is an amount of generation of the coma when the aperture 6 and the objective lens 1 are shifted interlocking with each other in the present example, and it can be confirmed that the generation of the coma is suppressed as compared to the conventional example (FIG. 8).

When the DVD is used, because the magnification m=0, the plane wave enters into the objective lens. In this case, even when the objective lens is shifted in the direction perpendicular to the optical axis, as the result, because the light flux does not obliquely enter into the objective lens, the coma is not generated.

EXAMPLE 2

The present example is the data of the optical system of the above second embodiment. As the first optical disk, the DVD (the thickness of the transparent substrate t1=0.6 mm) is used, and records/reproduces at the wavelength λ1=650 nm of the first semiconductor laser, and as the second optical disk, the CD/CD-R (the thickness of the transparent substrate t2=1.2 mm) is used, and records/reproduces at the wavelength λ2=780 nm of the second semiconductor laser. The lens data is shown in Table 3, and the data of the aspheric surface is shown in Table 4. Herein, the DVD has the same structure as the conventional technology in which the magnification m=0, and it has the feature when the CD is used. Accordingly, the description of the DVD is omitted in the same manner as in the Example 1, and only at the time of the use of the second optical disk, the DVD will be described.

TABLE 3

| i | r | d | N |
|---|---|---|---|
| 0 (light emitting point) | | 6.26 | 1 |
| 1 (correction lens) | 150.6 | 1.5 | 1.48616 |
| 2 | −19.91 | 2 | 1 |
| 3 (beam splitter) | ∞ | 5.5 | 1.51072 |
| 4 | ∞ | 1.5 | 1 |
| 5 (collimator) | 138.795 | 1.8 | 1.48616 |
| 6 | −12.738 | 3 | 1 |
| 7 (aperture) | | 1 | 1 |

TABLE 3-continued

| i | r | d | N |
|---|---|---|---|
| 8 (objective lens) | 2.077 | 2.3 | 1.48616 |
| 9 | −6.221 | 1.68 | 1 |
| 10 (transparent substrate) | ∞ | 1.2 | 1.57079 |
| 11 | ∞ | | |

TABLE 4

| | | |
|---|---|---|
| The 1st surface | A1 = 0.41472 × 10$^{-2}$ | P1 = 4.0 |
| | A2 = 0.89551 × 10$^{-4}$ | P2 = 6.0 |
| | A3 = −0.46056 × 10$^{-4}$ | P3 = 8.0 |
| | A4 = 0.15970 × 10$^{-4}$ | P4 = 10.0 |
| The 2nd surface | κ = −0.55213 × 10$^2$ | |
| | A1 = 0.16484 × 10$^{-2}$ | P1 = 4.0 |
| | A2 = 0.17200 × 10$^{-3}$ | P2 = 6.0 |
| | A3 = −0.18329 × 10$^{-4}$ | P3 = 8.0 |
| | A4 = 0.36642 × 10$^{-3}$ | P4 = 10.0 |
| The 6th surface | κ = −0.66062 | |
| The 8th surface | κ = −0.71605 | |
| | A1 = 0.26343 × 10$^{-2}$ | P1 = 4.0 |
| | A2 = 0.19542 × 10$^{-3}$ | P2 = 6.0 |
| | A3 = 0.14818 × 10$^{-4}$ | P3 = 8.0 |
| | A4 = 0.14002 × 10$^{-5}$ | P4 = 10.0 |
| The 9th surface | κ = −0.24580 × 10$^2$ | |
| | A1 = 0.51717 × 10$^{-2}$ | P1 = 4.0 |
| | A2 = −0.79229 × 10$^{-3}$ | P2 = 6.0 |
| | A3 = 0.82300 × 10$^{-4}$ | P3 = 8.0 |
| | A4 = −0.45680 × 10$^{-5}$ | P4 = 10.0 |

Figure 5:
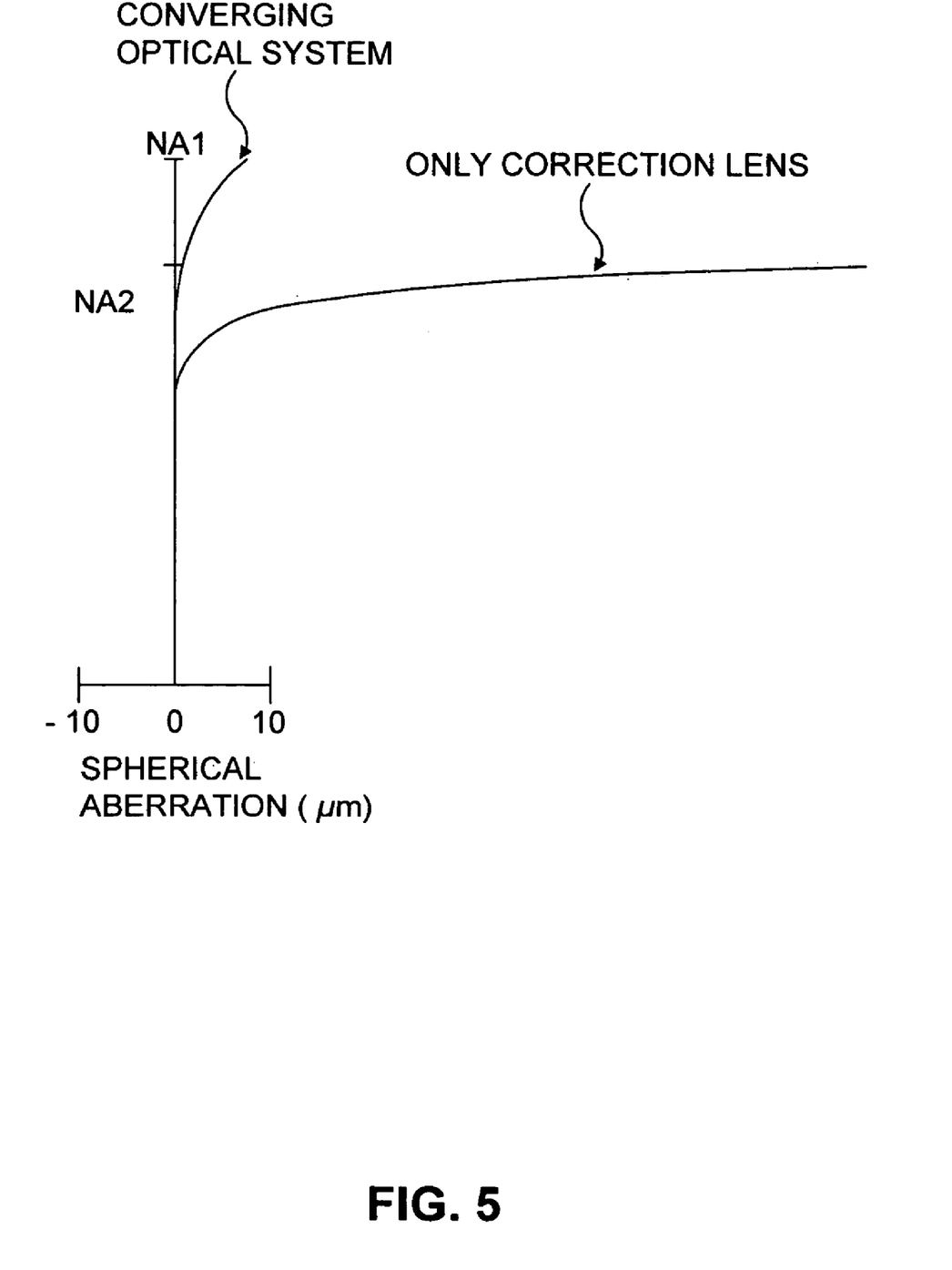
FIG. 5 is a view of the spherical aberration of the optical system and a correction lens of the second embodiment.

FIG. 5 is a view showing the spherical aberration of the whole converging optical system 5 and the spherical aberration of the correction lens 7 single body in the present example. As shown in the drawing, the correction lens 7 changes an amount of generation of the spherical aberration with a boundary at near the numerical aperture NA2 =0.45 in the actual use. In the vicinity of the optical axis, the spherical aberration is not larger than the diffraction limit, and as the light flux goes to the outside, the light flux is made to have the excessive spherical aberration. The residual spherical aberration on the axis in the range of the NA2 of the second optical disk in this design, is 0.002 λrms.

Figure 6:
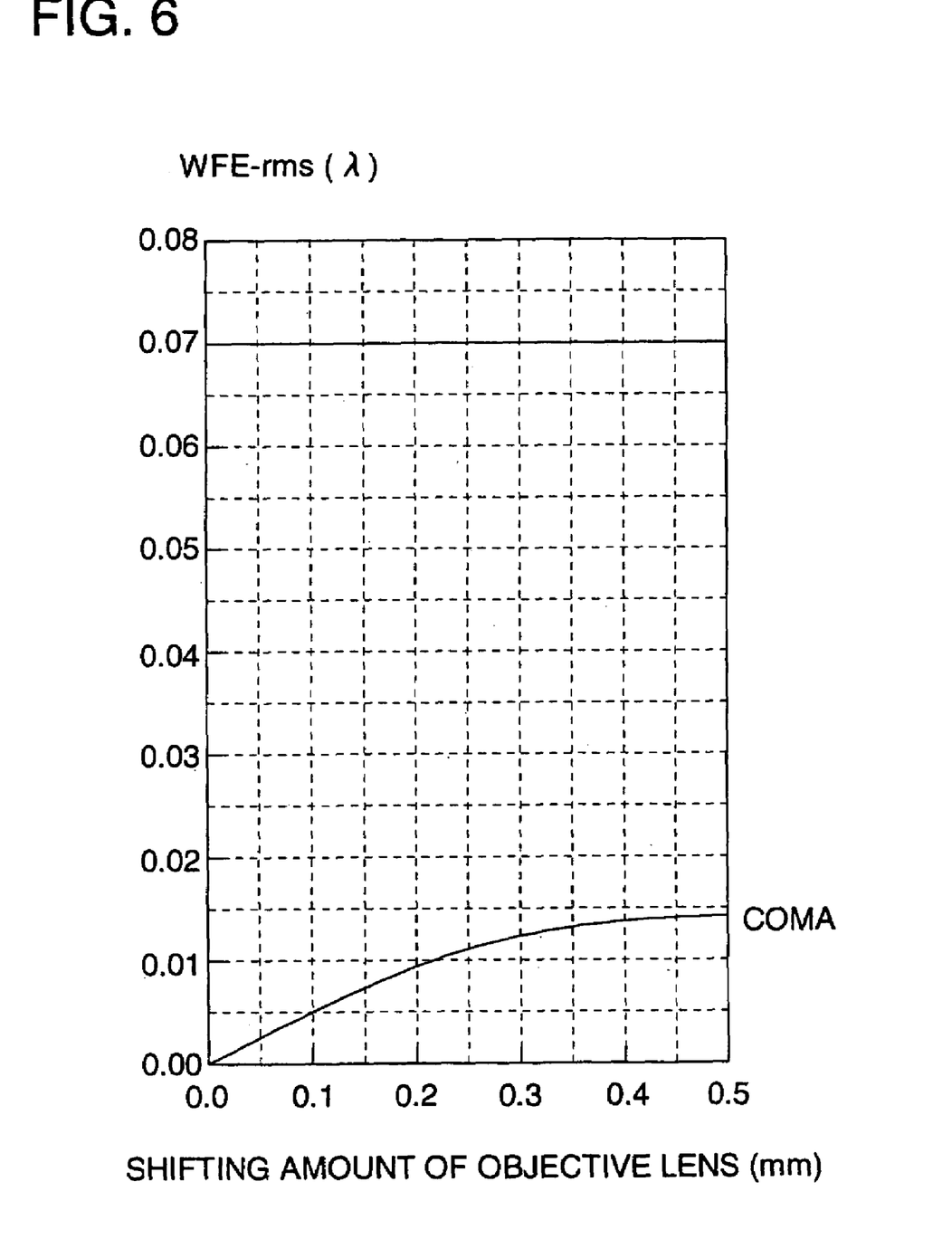
FIG. 6 is a view of the coma when an objective lens and an aperture are shifted by interlocking with each other, in a converging optical system of the second embodiment.

FIG. 6 is an amount of generation of the coma when the aperture 6 and the objective lens 1 are shifted interlocking with each other in the present example, and it can be confirmed that the generation of the coma is suppressed as compared to the conventional example (FIG. 8).

In the above embodiments and Examples, the non-parallel light flux entering into the objective lens is described as the diverging light flux, however, in the case of the converging light flux, the coma is generated by the objective lens shifting. In this case, the coma can be corrected by generating the insufficient spherical aberration on the outside of the numerical aperture NA in the actual use.

Further, as the above embodiment, the optical pick-up apparatus by which two kinds of optical disks with different transparent substrate thickness can be met with by one objective lens, is shown, however, it is of course that the non-parallel light flux incidence type optical pick-up apparatus for recording/reproducing of only one kind of optical disk may also be advantageous.

As described above, according to the present invention, the optical pick-up apparatus and correction lens in which the coma generated by the objective lens shifting is corrected, can be provided, while the spherical aberration on the axis of the converging optical system into which the non-parallel light flux such as the diverging light ray or the converging light ray enters, is corrected. Specifically, in the optical pick-up apparatus to record/reproduce the optical disks whose transparent substrate thickness is different, and in which the magnification of the objective lens is changed for the first optical disk and the second optical disk in order to correct the spherical aberration according to the difference of the thickness of the substrate, it can be advantageously conducted.

Disclosed embodiment can be varied by a skilled person without departing from the spirit and scope of the invention.

What is claimed is:

1. An optical pick-up apparatus for recording to or reproducing from a first optical information recording medium having a first information recording surface and thereon a first transparent substrate whose thickness is t1, and a second optical information recording medium having a second information recording surface and thereon a second transparent substrate whose thickness is t2, which is thicker than t1, the optical pick-up apparatus comprising:
   (a) a first light source for emitting a first light flux having a wavelength of $\lambda 1$ for recording to or reproducing from the first optical information recording medium, and a second light source for emitting a second light flux having a wavelength of $\lambda 2$, which is greater than $\lambda 1$, for recording to or reproducing from the first optical information recording medium,
   (b) a light converging optical system, which has an aperture, an objective lens and a correction lens, converging the first light flux onto the first information recording surface so that a wavefront aberration on the first information recording surface is not more than 0.07 $\lambda$rms,
   wherein the first light flux enters into the objective lens as parallel light and the second light flux enters in the objective lens as non-parallel light,
   wherein the aperture and the objective lens are interlocked and shifted in a direction perpendicular to an optical axis of the light converging optical system, and
   wherein the correction lens includes a first section and a second section, which is farther apart from the optical axis than the first section; and
   (c) a photodetector for detecting light reflected from the first or second information recording surface,
   wherein the second light flux, which is passed through the first section of the correction lens, generates a wavefront aberration of not more than 0.07 $\lambda$rms on the second optical information recording medium,
   wherein the second light flux, which is passed through the second section of the correction lens, generates an over-spherical aberration.

2. The optical pick-up apparatus of claim 1, wherein the objective lens is an aspherical lens.

3. The optical pick-up apparatus of claim 1, wherein the non-parallel light is a diverging light.

4. The optical pick-up apparatus of claim 1, wherein the correction lens is positioned nearer the second light source than the objective lens and the aperture.

5. The optical pick-up apparatus of claim 1, wherein the correction lens is a lens having an aspheric surface.

6. The optical pickup apparatus of claim 1, wherein a numerical aperture in the actual use of the second optical information recording medium is represented by NA2, and
   wherein the first section is within the range of the NA2 and the second section is outside the range of NA2.

7. An optical pick-up apparatus for recording to and reproducing from a first optical information recording medium having a first information recording surface and thereon a first transparent substrate whose thickness is t1, and a second optical information recording medium having a second information recording surface and thereon a second transparent substrate whose thickness is t2, which is thicker than t1, the optical pick-up apparatus comprising:
   (a) a first light source for emitting a first light flux having a wavelength of $\lambda 1$ for recording to or reproducing from the first optical information recording medium, and a second light source for emitting a second light flux having a wavelength of $\lambda 2$, which is greater than $\lambda 1$, for recording to or reproducing from the first optical information recording medium,
   wherein a numerical aperture in the actual use of the second optical information recording medium is represented by NA2;
   (b) a light converging optical system, which has an aperture, an objective lens converging the first light flux onto the first information recording surface so that a wavefront aberration on the first information recording surface is not more than 0.07 $\lambda$rms,
   wherein the first light flux enters into the objective lens as parallel light and the second light flux enters in the objective lens as non-parallel light, and
   wherein the aperture and the objective lens are interlocked and shifted in a direction perpendicular to an optical axis of the light converging optical system; and
   (c) a photodetector for detecting light reflected from the first or second information recording surface,
   wherein the wavefront aberration of the second light flux on the second information recording medium is not more than 0.07 $\lambda$rms within the range of NA2,
   wherein the second light flux has an over-spherical aberration outside the range of NA2.

8. The optical pick-up apparatus of claim 7, wherein the objective lens is an aspherical lens.

9. The optical pick-up apparatus of claim 7, wherein the non-parallel light is a diverging light.

* * * * *